United States Patent
Moens et al.

(10) Patent No.: US 6,844,072 B2
(45) Date of Patent: Jan. 18, 2005

(54) POWDERED THERMOSETTING COMPOSITION FOR COATINGS

(75) Inventors: Luc Moens, Sint-Genesius-Rode (BE); Nele Knoops, Herent (BE); Daniel Maetens, Brussels (BE)

(73) Assignee: Surface Specialties, S.A., Brussels (BE)

( * ) Notice: Subject to any disclaimer, the term of this patent is extended or adjusted under 35 U.S.C. 154(b) by 0 days.

(21) Appl. No.: 10/204,323

(22) PCT Filed: Dec. 17, 2001

(86) PCT No.: PCT/EP01/14888

§ 371 (c)(1),
(2), (4) Date: Nov. 18, 2002

(87) PCT Pub. No.: WO02/055620

PCT Pub. Date: Jul. 18, 2002

(65) Prior Publication Data

US 2003/0153640 A1 Aug. 14, 2003

(30) Foreign Application Priority Data

Dec. 21, 2000 (EP) .............................. 00128097

(51) Int. Cl.$^7$ .................... B32B 27/38; B32B 27/36; B05D 9/02; C08L 67/02; C08L 63/00

(52) U.S. Cl. .................... 428/413; 428/480; 427/386; 524/601; 525/176; 525/934

(58) Field of Search ................ 525/176, 934; 524/601; 427/386; 428/413, 480

(56) References Cited

U.S. PATENT DOCUMENTS 5,525,370 A * 6/1996 Hoebeke et al. ............. 427/195
6,635,721 B1 * 10/2003 Moens et al. ................ 525/438

FOREIGN PATENT DOCUMENTS

| EP | 1 067 159 | | 1/2001 |
| WO | WO91/14745 | * | 10/1991 |
| WO | 95/01407 | | 1/1995 |
| WO | WO97/20895 | * | 6/1997 |

OTHER PUBLICATIONS

DATABASE WPI, Section Ch, Week 199132, Derwent Publications Ltd., London, GB; AN 1991–234980 XP002204854—Abstract of JP 03 153771 (Jul. 1991).

* cited by examiner

Primary Examiner—Jeffrey B. Robertson
(74) Attorney, Agent, or Firm—Wenderoth Lind & Ponack, L.L.P.

(57) ABSTRACT

The present invention relates to powdered thermosetting compositions including a binder which comprises a carboxyl group containing amorphous isophthalic acid containing polyester, a carboxyl group containing semi-crystalline polyester, at least 10 parts by weight, based on the total weight of the binder, of a specific glycidyl group containing acrylic copolymer and a curing agent having functional groups reactive with the polyesters' carboxyl groups. The powdered thermosetting compositions are useful for the preparation of powdered paints and varnishes which give low gloss coatings having an outstanding flow, a remarkable weatherability and excellent mechanical properties.

23 Claims, No Drawings

POWDERED THERMOSETTING COMPOSITION FOR COATINGS

This application is a national stage entry of PCT/EP01/14888, filed on Dec. 17, 2001.

The present invention relates to powdered thermosetting compositions comprising as binder a co-reactable particulate mixture of a carboxyl group containing amorphous polyester, a carboxyl group containing semi-crystalline polyester, a glycidyl group containing acrylic copolymer and a curing agent having functional groups reactive with the polyesters' carboxyl groups. The invention also relates to the use of said compositions for the preparation of powdered paints and varnishes which give matt (low-gloss) coatings providing an outstanding flow, a remarkable weatherability and excellent mechanical properties. The invention further relates to the matt coatings obtainable from said compositions.

Powdered thermosetting compositions are widely used as paints and varnishes for coating the most various articles. These powders have numerous advantages. On the one hand the problems associated with solvents are completely eliminated and on the other hand the powders are not wasted, since only the powder in direct contact with the article is retained on the article, any excess powder being, in principle, entirely recoverable and reusable. For these and other reasons, powdered coating compositions are preferred to coating compositions in the form of solutions in e.g. organic solvents.

Powdered coating compositions should give coatings which have a good adhesion to metal substrates like steel or aluminium, a nice flow without defects and orange peel, a good flexibility and weatherability as well as a good chemical resistance. Besides, powdered coating compositions should exhibit a sufficiently high glass transition temperature to avoid reagglomeration during handling, transportation and storage.

The majority of today's coating compositions provide coatings having a high gloss after fusion and curing. The gloss measured at an angle of 60° in accordance with ASTM D523 is in fact often equal to or indeed even greater than 90%.

For example, WO 97/20895 discloses powdered thermosetting compositions including a binder consisting of a mixture of semi-crystalline and amorphous polyesters containing carboxyl groups, and a cross-linking agent with functional groups capable of reacting with the carboxyl groups of the polyesters. The powdered thermosetting compositions are useful for preparing powdered varnishes and paints and provide coatings having a remarkable weather resistance, high gloss and excellent mechanical properties.

WO 91/14745 discloses a thermosetting powder coating composition comprising as binder a co-reactable particulate mixture of a carboxylic acid-functional semi-crystalline polyester component and a curing agent having groups reactable with carboxylic acid groups. The composition may, if desired, include an amorphous polyester, which is said to afford coatings with improved weathering performance and improved resistance to gloss reduction of the coating during outdoor exposure. So-called "hybrid" powder coating compositions comprise an epoxy resin as a co-reactable curing agent. Polyglycidyl-functional acrylic polymers are mentioned among numerous other epoxy resins. The coatings obtained from these thermosetting powder compositions exhibit a high gloss.

While powdered compositions which provide high gloss coatings with good appearance and mechanical properties as well as good weather resistance are known, there is an increasing demand for powdered paints and varnishes which provide matt coatings of good quality, for example for coating certain accessories in the automotive industry, such as wheel rims, bumpers and the like, or for coating metal panels and beams used in construction.

Thus, various methods for manufacturing powdered paints and varnishes that provide matt coatings, have been proposed.

According to one of these methods one or more matting agents such as described in U.S. Pat. No. 4,242,253, are introduced into the powdered composition, in addition to the binder and conventional pigments.

U.S. Pat. No. 3,842,035 relates to a heat curable powder coating composition which, upon curing, gives a matt finish and which comprises a mixture of a slow curing and a fast curing thermosetting powder composition. The two compositions are extruded separately before dry-blending.

WO 92/01756 describes powder coating compositions comprised of one or more semi-crystalline hydroxyl polyesters, one or more amorphous polyesters and one or more hydroxyl acrylic polymers and a blocked polyisocyanate cross-linking agent. Coatings of the compositions on shaped metal articles exhibit an ASTM D-523-85-60° gloss value of not greater than 35.

In EP-A-0 551 064 powdered thermosetting compositions comprising as binder a mixture of a linear carboxyl group containing polyester and a glycidyl group containing acrylic copolymer are described. The acrylic polymer must have a number averaged molecular weight (Mn) of 4000 to 10000 in order to obtain coatings with useful physical properties. The compositions are useful for the preparation of powdered paints and varnishes which produce matt finishes having a gloss value measured at an angle of 60° in accordance with ASTM D523 equal to or less than 15.

Despite the existing variability of methods for producing matt finishes, experience has shown that these methods are all subject to one or more disadvantages attributed to problems of processing, as well as to overall coating performances. Problems are particularly relating to reproducibility and reliability of the gloss value.

There is thus still a need for powdered thermosetting compositions, capable of producing matt (low-gloss) coatings which do not exhibit the defects and drawbacks of the prior art.

In addition there is a sustained effort to improve flexibility and weatherability of the matt finishes in order to get them appropriate for applications such as coil coating, for example intended for outdoor construction purposes, especially for use in regions having a tropical climate.

However, when matt finishes are considered, no method is known today for preparing thermosetting powdered compositions from a single extrusion, which, upon curing provide criteria such as outstanding flow, remarkable weatherability and excellent flexibility and for which low gloss values are perceived in a reproducible and reliable manner.

According to the present invention, it now has been surprisingly found that by using as binder a co-reactable particulate mixture of a carboxyl group containing amorphous isophthalic acid containing polyester, a carboxyl group containing semi-crystalline polyester, at least 10 parts by weight of a specific glycidyl group containing acrylic copolymer and a curing agent having functional groups reactive with the polyesters' carboxyl groups, it is possible to obtain powdered thermosetting compositions which produce coatings exhibiting the desired characteristics.

Thus, according to the present invention there is provided a powdered thermosetting composition including a binder which comprises (a) a carboxyl group containing amorphous isophthalic acid containing polyester,
(b) a carboxyl group containing semi-crystalline polyester,
(c) at least 10 parts by weight, based on the total weight of the binder, of a glycidyl group containing acrylic copolymer, said copolymer comprising at least 10 mole % of a glycidyl group containing monomer and having a number averaged molecular weight (Mn) of at least 10000, and
(d) a curing agent having functional groups reactive with the polyesters' carboxyl groups.

The present composition is useful for preparing low-gloss coatings, i.e. coatings having a gloss value measured at an angle of 60° in accordance with ASTM D523 equal to or less than 40, preferably less than 35.

In the sense of the present application the term "isophthalic acid containing polyester" refers to a polyester which is composed of at least 10 mole % of isophthalic acid, preferably at least 50 mole %, based on the total acid constituents of the polyester.

The amorphous polyester and the semi-crystalline polyester independently may be linear or branched.

The carboxyl group containing amorphous polyester (a) of the present composition is preferably composed of, referring to the acid constituents, from 10 to 100 mole % of isophthalic acid, preferably 50 to 100 mole % and from 90 to 0 mole % of another diacid, such as an aliphatic, cycloaliphatic or aromatic diacid, and, referring to the alcohol constituents, from 70 to 100 mole % of neopentyl glycol and/or 2-butyl-2-ethyl-1,3-propanediol and from 30 to 0 mole % of of another diol, such as an aliphatic or cycloaliphatic diol. Branching of the amorphous polyester can be obtained by incorporation of a polyacid or polyol.

The acid constituent of the amorphous polyester, which is not the isophthalic acid, may preferably be selected from one or more aliphatic, cycloaliphatic or aromatic diacids such as fumaric acid, maleic acid, phthalic acid, terephthalic acid, 1,4-cyclohexanedicarboxylic acid, 1,3-cyclohexanedicarboxylic acid, 1,2-cyclohexanedicarboxylic acid, succinic acid, adipic acid, glutaric acid, pimelic acid, suberic acid, azelaic acid, sebacic acid, 1,12-dodecanedioic acid, etc., or the corresponding anhydrides.

Incorporation of e.g. up to 15 mole % relative to the isophthalic acid, of polyacids having at least three carboxylic acid groups such as trimellitic acid or pyromellitic acid or their corresponding anhydrides or mixtures thereof, induces branching of the polyester.

The glycol constituent of the amorphous polyester, which is not the neopentyl glycol and/or 2-butyl-2-ethyl-1,3-propanediol, may preferably be selected from one or more aliphatic or cycloaliphatic glycols, such as ethylene glycol, propylene glycol, 1,4-butanediol, 1,6-hexanediol, 1,4-cyclohexanediol, 1,4-cyclohexanedimethanol, 2-methyl-1,3-propanediol, hydrogenated Bisphenol A, hydroxypivalate of neopentyl glycol, etc.

Incorporation of e.g. up to 15 mole % relative to the neopentyl glycol and/or 2-butyl-2-ethyl-1,3-propanediol, of trifunctional or tetrafunctional polyols such as trimethylolpropane, di-trimethylolpropane, pentaerythrytol or mixtures therefore, The carboxyl group containing amorphous polyesters (a) of the present composition preferably have an acid number (AN) from 15 to 100 mg KOH/g and in particular from 30 to 70 mg KOH/g.

The carboxyl group containing amorphous polyesters are advantageously further characterised by:
a number averaged molecular weight (Mn) ranging from 1100 to 15000 and preferably from 1600 to 8500, measured by gel permeation chromatography (GPC);
a glass transition temperature (Tg) from 40 to 80° C., measured by Differential Scanning Calorimetry according to ASTM D3418 with a heating gradient of 20° C. per minute; and
an ICI (cone/plate) viscosity accordingly to ASTM D4287-88, measured at 200° C. ranging from 5 to 15000 mPa.s.

The carboxyl group containing amorphous polyester may fulfill one or more of the above conditions for its acid number, its number averaged molecular weight, its glass transition temperature and its ICI viscosity. Preferably, the amorphous polyester, however, fulfills all of these requirements.

The carboxyl group containing semi-crystalline polyester (b) of the present composition is preferably composed of, referring to the acid constituents, from 75 to 100 mole % of 1,4-cyclohexanedicarboxylic acid, or terephtalic acid, or mixtures thereof and from 25 to 0 mole % of another diacid, such as an aliphatic, cycloaliphatic or aromatic diacid and, referring to the alcohol constituents, from 75 to 100 mole % of an aliphatic non-branched diol and from 25 to 0 mole % of another aliphatic or cycloaliphatic diol.

Alternatively, the semi-crystalline polyester may be composed of, referring to the acid constituents, from 75 to 100 mole % of linear non-branched aliphatic diacid and from 25 to 0 mole % of another diacid, such as an aliphatic, cycloaliphatic or aromatic diacid, and referring to the alcohol constituents, from 75 to 100 mole % of aliphatic non-branched or a cycloaliphatic diol and from 25 to 0 mole % of of another aliphatic diol. Branching of the semi-crystalline polyester can be obtained by incorporation of a polyacid or a polyol or a mono-carboxylic acid having at least two hydroxyl groups or a mixture of them.

If the acid constituent of the semi-crystalline polyester of the present composition is for 75 to 100 mole % composed of 1,4-cyclohexanedicarboxylic acid, or terephthalic acid, or mixtures thereof, the 25 to 0 mole % of another diacid may be selected from fumaric acid, maleic acid, phthalic acid, isophthalic acid, terephthalic acid, 1,3-cyclohexanedicarboxylic acid, 1,2-cyclohexanedicarboxylic acid, succinic acid, adipic acid, glutaric acid, pimelic acid, suberic acid, azelaic acid, sebacic acid, 1,12-dodecanedioic acid, etc., or the corresponding anhydrides.

In this case, the alcohol constituent of the semi-crystalline polyester of the present composition preferably is for 75 to 100 mole % composed of an aliphatic non-branched diol such as ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, 1,16-hexadecanediol, etc. used in mixture or alone, and for 25 to 0 mole % of of another aliphatic or cycloaliphatic glycol, such as propylene glycol, neopentyl glycol, 2-methyl-1,3-propanediol, 2-butyl-2-ethyl-1,3-propanediol, hydrogenated Bisphenol A, hydroxypivalate of neopentyl glycol, 1,4-cyclohexanediol, 1,4-cyclohexanedimethanol, etc.

Otherwise, if the acid constituent of the semi-crystalline polyester of the present composition is for 75 to 100 mole % composed of linear non-branched aliphatic diacid, these may be selected from succinic acid, adipic acid, glutaric acid, pimelic acid, suberic acid, azelaic acid, sebacic acid, 1,12-dodecanedioic acid, etc. used in mixture of alone. Preferably the linear non-branched aliphatic diacid contains from 4 to 9 carbon atoms. The 25 to 0 mole % of another aliphatic, cycloaliphatic or aromatic diacid may be selected from fumaric acid, maleic acid, terephthalic acid, phthalic acid, isophthalic acid, 1,2-cyclohexanedicarboxylic acid, 1,3-cyclohexanedicarboxylic acid, 1,4-cyclohexanedicarboxylic acid, etc., or the corresponding anhydrides.

In this case, the glycol constituent of the semi-crystalline polyester of the present composition is for 75 to 100 mole % composed of cycloaliphatic diol such as 1,4-cyclohexanedimethanol, 1,4-cyclohexanediol or hydrogenated Bisphenol A, etc. used in mixture or alone, or aliphatic non-branched diol such as of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,14-tetradecanediol, 1,16-hexadecanediol, etc. used in mixture or alone, and for 25 to 0 mole % of of another aliphatic diol or polyol, such as of propylene glycol, neopentyl glycol, 2-methyl-1,3-propanediol, 2-butyl-2-ethyl-1,3-propanediol, hydroxypivalate of neopentyl glycol, 1,4-cyclohexanediol, 1,4-cyclohexanedimethanol, hydrogenated Bisphenol A, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,14-tetradecanediol, 1,16-hexadecanediol, etc.

Incorporation of e.g. up to 15 mole percentage based on the total of 1.4-cyclohexanedicarboxylic acid, or terephtalic acid, or non-branched aliphatic diacid, of polyacids having at least three carboxylic acid groups such as trimellitic acid or pyromellitic acid or their corresponding anhydrides, or of e.g. up to 15 mole percentage based on the total of aliphatic non-branched diol or cycloaliphatic diol, of trifunctional or tetrafunctional polyols such as trimethylolpropane, di-trimethylolpropane, pentaerytritol or mixtures of them, induces branching of the semi-crystalline polyesters.

The carboxyl group containing semi-crystalline polyesters of the present composition preferably have an acid number (AN) from 10 to 100 mg KOH/g and in particular from 15 to 80 mg KOH/g.

The carboxyl group containing semi-crystalline polyesters are advantageously further characterised by:

a number averaged molecular weight (Mn) ranging from 1100 to 17000 and preferably from 1400 to 11200, measured by gel permeation chromatography (GPC);

a fusion zone from 30 to 150° C., measured by Differential Scanning Calorimetry (DSC) according to ASTM D3418 with a heating gradient of 20° C. per minute;

a glass transition temperature (Tg) from −50 to +50° C., measured by Differential Scanning Calorimetry (DSC) according to ASTM D3418 with a heating gradient of 20° C. per minute;

a degree of crystallinity, measured by Differential Scanning Calorimetry (DSC) according to ASTM D3415 of at least 5 J/g and preferably at least 10 J/g; and an ICI (cone/plate) viscosity according to ASTM D4287-88, measured at 175° C. ranging from 5 to 20000 mPa.s.

The carboxyl group containing semi-crystalline polyester may fulfill one or more of the above conditions for its acid number, its number averaged molecular weight, its fusion zone, its glass transition temperature, its degree of crystallinity and its ICI viscosity. Preferably, the semi-crystalline polyester, however, fulfills all of the above requirements.

The glycidyl group containing acrylic copolymer (c) of the present composition is preferably composed of 10 to 90 mole % of a glycidyl group containing monomer and from 90 to 10 mole % of other monomers copolymerisable with the glycidyl group containing monomer.

The glycidyl group containing monomer used in the acrylic copolymer of the present composition may be selected from, for example, glycidyl acrylate, glycidyl methacrylate, methyl glycidyl methacrylate, methyl glycidyl acrylate, 3,4-epoxycyclohexylinethyl (meth)acrylate and acrylic glycidyl ether. These monomers can be used singly or in combination of two or more.

The other monomers of the acrylic copolymer copolymerisable with the glycidyl group containing monomer may be selected from:

40 to 100 mole percentage of acrylic or methacrylic ester monomers such as methyl acrylate, ethyl acrylate, n-propyl acrylate, isopropyl acrylate, n-butyl acrylate, n-decyl acrylate, methyl methacrylate, ethyl methacrylate, n-propyl methacrylate, isopropyl methacrylate, n-butyl methacrylate, isobutyl methacrylate, n-amyl methacrylate, n-hexyl methacrylate, isoamyl methacrylate, allyl methacrylate, sec-butyl methacrylate, tert-butyl methacrylate, 2-ethylbutyl methacrylate, cinnamyl methacrylate, crotyl methacrylate, cyclohexyl methacrylate, cyclopentyl methacrylate, methallyl methacrylate, n-octyl methacrylate, 2-ethylhexyl methacrylate, 2-phenylethyl methacrylate and phenyl methacrylate.

0 to 60 mole percentage of other ethylenically unsaturated copolymerisable monomers such as styrene, alkyl-substituted styrenes and chloro-substituted styrenes, acrylonitrile, vinyl chloride, vinylidene fluoride and vinyl acetate.

The glycidyl group containing acrylic copolymers of the present composition preferably have an epoxy equivalent weight of 0.3 to 5.0 and preferably from 1.0 to 3.0 milliequivalents of epoxy/gram of polymer.

The glycidyl group containing acrylic copolymers may further be characterised by:

a number averaged molecular weight (Mn) ranging from 10000 to 25000, preferably 10.100 to 25.000, measured by gel permeation chromatography (GPC);

a glass transition temperature (Tg) from 40 to 85° C., measured by Differential Scanning Calorimetry (DSC), according to ASTM D3418 with a heating gradient of 20° C. per minute;

an ICI (cone/plate) viscosity determined by the ICI method at 200° C. ranging from 50 to 50000 mPa.s.

The glycidyl group containing acrylic copolymer may fulfill one or more of the above conditions for its epoxy equivalent weight, its number averaged molecular weight, its glass transition temperature and its ICI viscosity. Preferably, the acrylic copolymer, however, fulfills all of the above requirements.

The curing agent in accordance to the present invention, having functional groups reactive with the polyesters' carboxyl groups, may be selected from:

polyepoxy compounds preferably being solid at room temperature and containing at least two epoxy groups per molecule such as, for example, triglycidyl isocyanulate like the one marketed under the name Araldite PT810 (Ciba) or the epoxy resin Araldite PT910 (Ciba); and β-hydroxyalkylamide group containing compounds which preferably contain at least one, more preferably two bis(β-hydroxyalkyl)amide groups, for example, those mentioned in U.S. Pat. No. 4,727,111, U.S. Pat. No. 4,076,917, EP-A-0 322 834 and EP-A-0 473 380.

The carboxyl group containing amorphous polyester and the carboxyl group containing semi-crystalline polyester of the present composition are preparable using conventional esterification techniques well known in the art. The polyesters are prepared according to a procedure consisting of one or more reaction steps.

For the preparation of these polyesters, a conventional reactor equipped with a stirrer, an inert gas (nitrogen) inlet, a thermocouple, a distillation column connected to a water-cooled condenser, a water separator and a vacuum connection tube can be used.

The esterification conditions used to prepare the polyesters are conventional, namely a standard esterification catalyst, such as dibutyltin oxide, dibutyltin dilaurate, n-butyltin trioctoate, sulphuric acid or a sulphonic acid, can be used in an amount from 0.05 to 1.50% by weight of the reactants and optionally, colour-stabilisers, for example, phenolic antioxidants such as Irganox 1010 (Ciba) or phosphonite- and phosphite-type stabilisers such as tributylphosphite, can be added in an amount from 0 to 1% by weight of the reactants.

Polyesterification is generally carried out at a temperature which is gradually increased from 130° C. to about 190 to 250° C., first under normal pressure, then, when necessary, under reduced pressure at the end of each process step, while maintaining these operating conditions until a polyester is obtained, which has the desired hydroxyl and/or acid number. The degree of esterification is followed by determining the amount of water formed in the course of the reaction and the properties of the obtained polyester, for example the hydroxyl number, the acid number, the molecular weight or the viscosity.

When polyesterification is complete, cross-linking catalysts can optionally be added to the polyester while it is still in the molten state. These catalysts are added in order to accelerate cross-linking of the thermosetting powder composition during curing. Examples of such catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide or tetrapropylphosphonium chloride). These catalysts are preferably used in an amount of 0 to 5% with respect of the weight of the polyester.

The glycidyl group containing acrylic copolymer is preparable by conventional polymerisation techniques, either in mass, in emulsion, or in solution in an organic solvent. The nature of the solvent is very little of importance, provided that it is inert and that it readily dissolves the monomers and the synthesised copolymer. Suitable solvents include toluene, ethyl acetate, butyl acetate, xylene, etc. The monomers are copolymerised in the presence of a free radical polymerisation initiator (benzoyl peroxide, dibutyl peroxide, azo-bis-isobutyronitrile, and the like) in an amount representing 0.1 to 4.0% by weight of the monomers.

To achieve a good control of the molecular weight and its distribution, a chain transfer agent, preferably of the mercaptan type, such as n-dodecylmercaptan, t-dodecanethiol, iso-octylmercaptan, or of the carbon halide type, such as carbon tetrabromide, bromotrichloromethane, etc., is also added in the course of the reaction. The chain transfer agent is used in amounts of up to 10% by weight of the monomers used in the copolymerisation.

A cylindrical, double walled reactor equipped with a stirrer, a condenser, an inert gas (nitrogen, for example), inlet and outlet, and metering pump feed systems are generally used to prepare the glycidyl group containing acrylic copolymer.

Polymerisation can be carried out under conventional conditions. Thus, when polymerisation is carried out in solution, for example, an organic solvent is introduced into the reactor and heated to reflux temperature under an inert gas atmosphere (nitrogen, carbon dioxide, and the like) and a homogeneous mixture of the required monomers, free radical polymerisation initiator and chain transfer agent, when needed, is then added to the solvent gradually over several hours. The reaction mixture is then maintained at the indicated temperature for some hours, while stirring. The copolymer obtained is subsequently freed from the solvent in vacuo.

Preferably, the binder system of the thermosetting powdered composition of the present invention comprises based on the total weight of the binder:

2 to 88.5, preferably 40 to 80 and more preferably 45 to 75 parts by weight of the carboxyl group containing amorphous isophthalic acid containing polyester, 1 to 85, preferably 5 to 40 and more preferably 10 to 30 parts by weight of the carboxyl group containing semi-crystalline polyester, 10 to 60, preferably 15 to 40 and more preferably 20 to 35 parts by weight of the glycidyl group containing acrylic copolymer, and 0.5 to 10.0, preferably 1 to 5 and more preferably 2 to 3 parts by weight of the curing agent having functional groups reactive with the polyesters' functional groups.

The binder system of the thermosetting composition of the present invention is preferably composed in such a way that for each equivalent of carboxyl group present in the amorphous polyester (a) and semi-crystalline polyester (b) there is between 0.3 and 2.0 and preferably between 0.6 and 1.7 equivalents of epoxy groups from the acrylic copolymer (c) and between 0.2 and 1.2 and preferably between 0.4 and 1.0 equivalents of reactive functional groups of the curing agent (d).

The thermosetting polyester blend (a & b), when needed, can be obtained by dry blending the amorphous and the semi-crystalline polyester using a mechanical mixing procedure as available for the premixing of the powder paint constituents.

Alternatively the amorphous and the semi-crystalline polyester can be blended in the melt using a conventional cylindrical double-walled reactor or by extrusion such as with the Betol BTS40.

In addition to the essential components described above, compositions within the scope of the present invention can also include one or more additive(s) such as catalysts, fillers, flow control agents such as Resiflow PV5 (Worlee), Modaflow (Monsanto), Acronal 4F (BASF), etc., and degassing agents such as benzoin (BASF) etc. To the formulation UV-light absorbers such as Tinuvin 900 (Ciba), hindered amine light stabilisers represented by Tinuvin 144 (Ciba). Other stabilising agents such as Tinuvin 312 and 1130 (Ciba), antioxidants such as Irganox 1010 (Ciba) and stabilisers from the phosphonite or phosphite type can be added.

Both, pigmented systems as well as clear lacquers can be prepared.

A variety of dyes and pigments can be utilised in the composition of this invention. Examples of useful pigments and dyes are metallic oxides such as titaniumdioxide, ironoxide, zincoxide and the like, metal hydroxides, metal powders, sulphides, sulphates, carbonates, silicates such as ammoniumsilicate, carbon black, talc, china clay, barytes, iron blues, lead blues, organic reds, organic maroons and the like.

The components of the composition according to the invention may be mixed by dry blending in a mixer or blender (e.g. drum mixer). The premix is then homogenised at temperatures ranging from 70 to 150° C. in a single screw extruder such as the BUSS-Ko-Kneter or a double screw extruder such as the PRISM or APV. The extrudate, when cooled down, is grounded to a powder with a particle size preferably ranging from 10 to 150 μm.

The powdered composition may be deposited on the substrate by use of a powder gun such as an electrostatic CORONA gun or TRIBO gun. On the other hand well known methods of powder deposition such as the fluidised bed technique can be used. After deposition the powder is heated to a temperature between 160 and 320° C., causing the particles to flow and fuse together to form a smooth, uniform, continuous, uncratered coating on the substrate surface.

Thus, the present invention further relates to the use of the above described compositions as powdered varnish or paint or for the preparation of a powdered varnish or paint. The invention further relates to the powdered varnishes or paints consisting of or comprising the present powdered thermosetting composition.

Furthermore, the present invention relates to a method of preparing a coating on a substrate comprising the steps of applying the above varnish or paint to the substrate and heating the coated substrate to fuse and cure the powdered varnish or paint to obtain the coating.

Furthermore, the present invention also refers to a coating preparable by the above method and a substrate entirely or partially coated with such coating.

The following examples are submitted for a better understanding of the invention but are not intended to restrict the invention thereto.

If not otherwise stated, all amounts are given in parts by weight.

Besides the abbreviations already defined above, Mw stands for weight-average molecular weight, OHN stands for hydroxyl number and Tm stands for fusion zone.

EXAMPLE 1

Preparation of a Glycidyl Group Containing Acrylic Copolymer 80 parts of n-butyl acetate are brought in a double walled flask of 5 l equipped with a stirrer, a water cooled condenser, an inlet for nitrogen and a thermocouple attached to a thermoregulator.

The flask content is then heated and stirred continuously while nitrogen is purged through the solvent. At a temperature of 125° C. a mixture of 0.8 parts of tert-butylperoxybenzoate in 20 parts of n-butyl acetate are fed in the flask during 215 minutes with a peristaltic pump. 5 minutes after this start another pump is started with the feeding of a mixture of 22 parts of styrene, 24 parts of glycidyl methacrylate, 40 parts of butyl methacrylate and 14 parts of methyl methacrylate, during 180 minutes. The synthesis takes 315 minutes.

After evaporation of the n-butyl acetate an acrylic copolymer with the following characteristics is obtained:

| | |
|---|---|
| ICI200° C. (cone/plate) | 16000 mPa · s |
| Mn | 15000 |
| Mw | 38200 |

EXAMPLES 2 TO 6

Accordingly the procedure as described in example 1, the acrylic copolymers of example 2 to example 6, having the compositions as in table 1, were prepared.

TABLE 1

| | example 2* | example 3 | example 4 | example 5 | example 6* |
|---|---|---|---|---|---|
| styrene | 22 | 22 | 25.5 | 23 | 27.2 |
| glycidyl methacrylate | 24 | 24 | 12 | 24 | 6 |
| butyl methacrylate | 40 | 40 | 46.3 | 15 | 49.5 |
| methyl methacrylate | 14 | 14 | 16.2 | 38 | 17.3 |
| n-butyl peroxybenzoate | 2.0 | 0.6 | 0.8 | 0.8 | 0.8 |
| Mn | 9300 | 22600 | 16600 | 17000 | 15500 |
| Mw | 20400 | 52400 | 39800 | 40500 | 38600 |
| ICI200° C., mPa · s | 4200 | 30000 | 24000 | 40000 | 17000 |

*Comparative examples

Ex 2 and 6 are comparative examples because the number averaged molecular weight (Mn) of the copolymer obtained in Ex 2 is below 10000 and the glycidyl methacrylate content of the copolymer of Ex 6 is below 10 mole %.

EXAMPLE 7

Synthesis of an Isophthalic Acid Containing Amorphous Polyester 424.0 parts of neopentyl glycol are placed in a conventional four neck round bottom flask equipped with a stirrer, a distillation column connected to a water cooled condenser, an inlet for nitrogen and a thermometer attached to a thermoregulator.

The flask contents are heated, while stirring under nitrogen, to a temperature of circa 130° C. at which point 217.7 parts of terephthalic acid and 355.2 parts of isophthalic acid and 2.2 parts of n-butyltintrioctoate are added. The heating is continued gradually to a temperature of 230° C. Water is distilled from the reactor from 180° C. on. When distillation under atmospheric pressure stops, a vacuum of 50 mm Hg is gradually applied. After three hours at 230° C. and 50 mm Hg, the following characteristics are obtained:

| | |
|---|---|
| AN | 4 mg KOH/g |
| OHN | 83 mg KOH/g |

To the first step prepolymer standing at 200° C., 147.7 parts of isophthalic acid are added. Thereupon, the mixture is gradually heated to 230° C. After a 2 hour period at 230° C. and when the reaction mixture is transparent, a vacuum of 50 mm Hg is gradually applied. After 3 hours at 230° C. and 50 mm Hg, the following characteristics are obtained:

| | |
|---|---|
| AN | 33 mg KOH/g |
| OHN | 3 mg KOH/g |
| ICI200° C. (cone/plate) | 3500 mPa · s |
| Tg (DSC, 20°/min) | 58° C. |

EXAMPLE 8

Synthesis of an Isophthalic Acid Containing Amorphous Polyester

A mixture of 395.9 parts of neopentyl glycol and 15.6 parts of trimethylolpropane is placed in a conventional four neck round bottom flask as for example 7.

The flask contents are heated, while stirring under nitrogen, to a temperature of circa 130° C. at which point 692.8 parts of isophthalic acid, 36.5 parts of adipic acid and 2.5 parts of n-butyl-tintrioctoate are added. The heating is continued gradually to a temperature of 230° C. Water is distilled from the reactor from 180° C. on. When distillation under atmospheric pressure stops, a vacuum of 50 mm Hg is gradually applied. After three hours at 230° C. and 50 mm Hg, the following characteristics are obtained:

| | |
|---|---|
| AN | 48 mg KOH/g |
| OHN | 3 mg KOH/g |
| ICI200° C. (cone/plate) | 4900 mPa · s |
| Tg (DSC, 20°/min) | 59° C. |

EXAMPLES 9 TO 10

Accordingly the procedure as described in example 8, the amorphous polyesters of examples 9 and 10, having the compositions as in table 2, are prepared.

TABLE 2

| | example 9 | example 10 |
|---|---|---|
| neopentyl glycol | 413.6 | 423.8 |
| trimethylolpropane | 9.3 | |
| isophthalic acid | 721.4 | 720.3 |
| AN, mg KOH/g | 32 | 30 |
| OHN, mg KOH/g | 3 | 2 |
| ICI200° C., mPa · s | 4500 | 3000 |
| Tg (DSC 20°/min), ° C. | 63 | 57 |

EXAMPLE 11

Synthesis of a Cycloaliphatic Semi-Crystalline Polyester

A mixture of 532.1 parts of 1,4-cyclohexanedimethanol, 15.9 parts of trimethylolpropane, 591.3 parts of adipic acid and 2.5 parts of n-butyltintrioctoate is placed in a reactor as for Example 8. The flask contents are heated, while stirring under nitrogen to a temperature of circa 140° C., at which point water is distilled from the reactor. The heating is continued gradually to a temperature of 220° C. When distillation under atmospheric pressure stops, 1.0 part of tributylphosphite and 1.0 part of n-butyltintrioctoate are added and a vacuum of 50 mm Hg is gradually applied. After 5 hours at 220° C. and 50 mm Hg, the following characteristics are obtained:

| | |
|---|---|
| AN | 22 mg KOH/g |
| OHN | 3 mg KOH/g |
| ICI200° C. (cone/plate) | 6500 mPa · s |
| Fusion zone | 79–96° C. |

EXAMPLES 12 TO 15

Accordingly the procedure as described in example 11, the semi-crystalline polyesters of examples 12 to 15, having the compositions as in table 3, are prepared.

TABLE 3

| | example 12 | example 13 | example 14 | example 15 |
|---|---|---|---|---|
| 1,4-cyclohexanedimethanol | | 448.1 | 477.3 | |
| 1,4-cyclohexanediol | 467.3 | | | |
| 1,6-hexanediol | | | | 508.2 |
| trimethylolpropane | 15.5 | | | 15.9 |
| adipic acid | 638.5 | 165.3 | 319.8 | 628.4 |
| 1,12-dodecanoic acid | | 496.0 | 319.8 | |
| AN, mg KOH/g | 21 | 22 | 32 | 19 |
| OHN, mg KOH/g | 3 | 2 | 3 | 2 |
| ICI, mPa · s | 8800 | 3500 | 3000 | 3200 |
| | (175° C.) | (150° C.) | (150° C.) | (150° C.) |
| Tm, ° C. | 39–47 | 67–77 | 70–80 | 48–55 |

EXAMPLE 16

The polyesters and acrylic copolymers as illustrated above, are then formulated to a powder according to one of the formulations A or B as mentioned below.

| Formulation A White paint formulation | | Formulation B Brown paint formulation | |
|---|---|---|---|
| Binder | 74.00 | Binder | 78.33 |
| Kronos 2310 (white pigment) | 24.67 | Bayferrox 130 (pigment) | 4.44 |
| Resiflow PV5 (flow control agent) | 0.99 | Bayferrox 3950 (pigment) | 13.80 |
| Benzoin (degassing agent) | 0.34 | Carbon Black FW2 (pigment) | 1.09 |
| | | Resiflow PV5 (flow control agent) | 0.99 |
| | | Benzoin (degassing agent) | 0.35 |

For the preparation of the powder formulation, the carboxyl group containing isophthalic acid containing amorphous polyester resin and the carboxyl group containing semi-crystalline polyester resin can be used as a blend or as separate resins. When used as a blend, blending is done by mixing the respective resins in the molten state using a conventional round bottom flask.

The powders are prepared first by dry blending of the different components and then by homogenisation in the melt using a PRISM 16 mm L/D 15/1 twin screw extruder at an extrusion temperature of 85° C. The homogenised mix is then cooled and grinded in an Alpine UPZ100. Subsequently the powder is sieved to obtain a particle size between 10 and 110 μm. The powder thus obtained is deposited on chromated (Cr6+) aluminium H5005, DIN 50939 with a thickness of 1 mm, by electrostatic deposition using the GEMA—Volstatic PCG 1 spray gun. At a film thickness between 50 and 80 μm the panels are transferred to an air-ventilated oven, where curing proceeds for 15 minutes at a temperature of 200° C.

The paint characteristics for the finished coatings obtained from formulation A (example 16 to 34) and from formulation B (examples 35 and 36) with binder compositions as specified in table 4, are summarized in tables 5 and 6.

TABLE 4

| | 1 | 2 | 3 | 4* | 5* | 6* |
|---|---|---|---|---|---|---|
| amorphous polyester | 50.75 | 58.00 | 51.90 | 62.65 | 72.50 | 51.90 |
| semi-crystalline polyester | 21.75 | 14.50 | 13.00 | 26.85 | — | 22.20 |
| acrylic copolymer | 25.30 | 25.30 | 32.40 | 7.80 | 25.30 | 25.90 |
| curing agent | 2.20 | 2.20 | 2.70 | 2.70 | 2.20 | — |

*the binders 4, 5 and 6 are comparative

TABLE 5

| formulation A | binder | amorphous polyester | semi-crystalline polyester | acrylic co-polymers | curing agent | gloss | DI | RI |
|---|---|---|---|---|---|---|---|---|
| Ex 16 | 1 | Ex 7 | Ex 14 | Ex 1 | XL552 | 5 | 100 | 120 |
| Ex 17 | 1 | Ex 7 | Ex 11 | Ex 1 | XL552 | 3 | 140 | 100 |
| Ex 18 | 2 | Ex 7 | Ex 11 | Ex 1 | XL552 | 3 | 80 | 60 |
| Ex 19 | 1 | Ex 7 | Ex 11 | Ex 1 | PT810 | 4 | 80 | 80 |
| Ex 20 | 3 | Ex 8 | Ex 12 | Ex 1 | XL552 | 25 | 100 | 100 |
| Ex 21 | 3 | Ex 8 | Ex 12 | Ex 4 | XL552 | 31 | 100 | 80 |
| Ex 22 | 2 | Ex 9 | Ex 12 | Ex 1 | PT910 | 26 | 80 | 80 |
| Ex 23 | 2 | Ex 9 | Ex 12 | Ex 3 | PT910 | 20 | 80 | 60 |
| Ex 24 | 1 | Ex 9 | Ex 12 | Ex 3 | XL552 | 25 | 120 | 100 |
| Ex 25 | 1 | Ex 9 | Ex 13 | Ex 3 | XL552 | 12 | 120 | 100 |
| Ex 26 | 1 | Ex 9 | Ex 15 | Ex 3 | XL552 | 26 | 100 | 80 |
| Ex 27 | 1 | Ex 9 | Ex 13 | Ex 5 | XL552 | 25 | 100 | 80 |
| Ex 28 | 1 | Ex 9 | Ex 13 | Ex 5 | PT910 | 27 | 80 | 80 |
| Ex 29 | 1 | Ex 10 | Ex 11 | Ex 1 | XL552 | 5 | 140 | 100 |
| Ex 30* | 1 | Ex 10 | Ex 11 | Comp.Ex 2 | XL552 | 85 | 140 | 120 |
| Ex 31* | 4 | Ex 10 | Ex 11 | Ex 1 | XL552 | 36 | 120 | 100 |
| Ex 32* | 5 | Ex 10 | — | Ex 1 | XL552 | 6 | 20 | 0 |
| Ex 33* | 6 | Ex 10 | Ex 11 | Ex 1 | — | 5 | 0 | 0 |
| Ex 34* | 1 | Ex 10 | Ex 11 | Comp. Ex 6 | XL552 | 90 | 100 | 100 |
| Ex 35 | 1 | Ex 9 | Ex 11 | Ex 1 | XL552 | 28 | 120 | 100 |
| Ex 36 | 2 | Ex 8 | Ex 12 | Ex 5 | XL552 | 30 | 100 | 80 |

*Examples 30 to 34 are comparative
In table 5:
Column 1: indicates the identification number of the formulation
Column 2: indicates the binder composition according to table 4
Column 3: indicates the type of amorphous polyester
Column 4: indicates the type of semi-crystalline polyester
Column 5: indicates the type of acrylic copolymer
Column 6: indicates the type of the curing agent having functional groups being reactive with the polyesters' carboxyl groups where: PT810 = Araldite 810 (Ciba) = triglycidylisocyanurate PT910 = Araldite 910 (Ciba) = diglycidylterephthalate/ triglycidyltrimellitate mixture (75/25) XL552 = Primid XL552 (EMS) = N,N,N',N'-tetrakis-(2-hydroxyethyl)-adipamide
Column 7: indicates the 60° gloss, measured according to ASTM D523
Column 8: indicates the direct impact strength according to ASTM D2794. The highest impact which does not crack the coating is recorded in kg · cm
Column 9: indicates the reverse impact strength according to ASTM D2794. The highest impact which does not crack the coating is recorded in kg · cm Except for the formulation of reference example 31, where a wrinkle-type finish is observed, the coatings obtained from the different formulations all prove to have a very smooth visual perception, free of any defects.

The different coatings all have a flexibility of 0T or 1T maximum, according to the ASTM D4145-83 T-bending test, with the exception of the formulations of reference examples 32 and 33 where values higher than 3T, indicating a huge lack of flexibility, are perceived upon bending.

As clearly appears from table 5:

- the carboxyl group containing semi-crystalline polyester is necessary for providing flexibility to the coating (comparative example 32 versus example 29)
- decreasing the amount of semi-crystalline polyester reduces flexibility of the derived coating (example 18 versus example 17, example 23 versus example 24)
- the type of curing agent has no influence on the gloss and minor influence on flexibility (examples 17 & 19, 27 & 28)
- when the curing agent is omitted no influence on gloss, yet a huge influence on flexibility is perceived (comparative example 33 versus example 29)
- all glycidyl functionality of the acrylic copolymer, within the range as specified in the present invention, gives low gloss coatings without influencing flexibility (examples 20 & 21)

However, when an acrylic copolymer, having a too low glycidyl functionality (glycidyl group containing monomer content is lower than 10 mole percentage) as for the acrylic copolymer of example 6, is used, a high gloss value is observed (comparative example 34) for the resulting coating.

- modifying the acrylic copolymer composition (example 27) or the acrylic copolymer molecular weight (example 23) within the specifications of the present invention results in matt flexible finishes.
- Only when the number average molecular weight is lower than 10000, as for the acrylic copolymer of example 2, a high gloss finish is observed (comparative example 30).

As appears from table 5, the powdered compositions according to the present invention (examples 16 to 29, 35 and 36) thus prove to satisfy a unique combination of properties. They are particularly useful to obtain low gloss coatings with an outstanding flexibility and flow.

The thermosetting powdered compositions according to the present invention are obtained from a single extrusion and give low gloss finishes in a reproducible and reliable way.

Moreover, the powders according to the present invention prove to satisfy an excellent outdoor resistance comparable to the currently used nowadays commercial available powders.

In table 6, the relative 60° gloss values, recorded every 400 hours, according to ASTM D523, are reported for the coating obtained from examples 35 and 36, submitted to the Q-UV accelerated weathering test. In the same table (comparison) are given the weathering results of a carboxylic acid functionalised amorphous polyester obtained by reacting 400,6 parts of neopentyl glycol, 22,3 parts of trimethylolpropane and 724,7 parts of isophthalic acid, in the same manner as in example 8.

This polyester has an AN of 32 mg KOH/g and a Tg of 59° C., determined by DSC with a heating rate of 20° C./min. This polyester is formulated in a 93/7 ratio with PT810 according to the brown paint formulation as in formulation B. Thus, the comparison formulation did not contain any semi-crystalline polyester or acrylic copolymer.

In this table only gloss reductions until about 50% of the maximum value are mentioned. Weathering measurements are conducted in a very severe environment, i.e. the Q-UV accelerated weathering tester (Q-Panel Co) according to ASTM G53-88 (standard practice for operating light and water exposure apparatus—fluorescent UV/condensation type—for exposure of nonmetallic materials).

For the results of table 6, coated panels have been subjected to the intermittent effects of condensation (4 hours at 50° C.) as well as the damaging effects of sunlight simulated by fluorescent UV-A lamps (340 nm, 1=0.77 W/m2/nm) (8 hours at 60° C.).

TABLE 6

| | UV-A (340 nm, I = 0.77 W/m2/nm) | | |
|---|---|---|---|
| Hours | example 36 | example 35 | Comparison |
| 0 | 100 | 100 | 100 |
| 400 | 100 | 99 | 100 |
| 800 | 99 | 100 | 100 |
| 1200 | 98 | 97 | 97 |
| 1600 | 98 | 96 | 97 |
| 2000 | 97 | 97 | 97 |
| 2400 | 98 | 96 | 96 |
| 2800 | 99 | 94 | 95 |
| 3200 | 98 | 88 | 92 |
| 3600 | 95 | 85 | 89 |
| 4000 | 90 | 86 | 87 |
| 4400 | 87 | 84 | 84 |
| 4800 | 84 | 77 | 79 |
| 5200 | 78 | 66 | 76 |
| 5600 | 77 | 61 | 73 |
| 6000 | 74 | 52 | 67 |
| 6400 | 53 | 43 | 59 |
| 6800 | 54 | | 54 |
| 7200 | 47 | | 49 |
| 7600 | 40 | | |

What is claimed is:

1. Powdered thermosetting composition including a binder which comprises
   (a) a carboxyl group containing amorphous isophthalic acid containing polyester,
   (b) a carboxyl group containing semi-crystalline polyester,
   (c) at least 10 parts by weight, based on the total weight of the binder, of a glycidyl group containing acrylic copolymer, said copolymer comprising at least 10 mole % of a glycidyl group containing monomer and having a number averaged molecular weight (Mn) of at least 10000, and
   (d) a curing agent having functional groups reactive with the polyesters' carboxyl groups.

2. Composition according to claim 1, wherein the carboxyl group containing amorphous isophthalic acid containing polyester consists of 10–100 mole % isophthalic acid and 0–90 mole % of another diacid, based on the total of the acid constituents, and 70–100 mole % neopentyl glycol and/or 2-butyl-2-ethyl-1,3-propanediol and 0–30 mole % of another diol, based on the total of the alcohol constituents.

3. Composition according to claim 2, wherein the carboxyl group containing amorphous isophthalic acid containing polyester further contains up to 15 mole % of polyacids relative to the isophthalic acid and/or up to 15 mole % of polyols, relative to the neopentylglyol and/or 2-butyl-2-ethyl-1,3-propanediol.

4. Composition according to claim 1, wherein the carboxyl group containing amorphous isophthalic acid containing polyester has an acid number (AN) from 15–100 mg KOH/g, a number averaged molecular weight (Mn) from 1100 to 15000, a glass transition temperature (Tg) from 40–80° C. and an ICI (cone/plate) viscosity at 200° C. from 5–15000 mPa.s.

5. Composition according to claim 1, wherein the carboxyl group containing semi-crystalline polyester consists of 75–100 mole % of 1,4-cyclohexanedicarboxylic acid, or terephthalic acid, or mixtures thereof, and 0–25 mole % of another diacid, based on the total of the acid constituents, and 75–100 mole % of an aliphatic non-branched diol and 0–25 mole % of another aliphatic or cycloaliphatic diol, based on the total of the alcohol constituents.

6. Composition according to claims 1, wherein the carboxyl group containing semi-crystalline polyester consists of 75–100 mole % of linear non-branched aliphatic diacid and 0–25 mole % of another diacid, based on the total of the acid constituents, and 75–100 mole % of an aliphatic non-branched or cycloaliphatic diol and 0–25 mole % of another aliphatic diol, based on the total of the alcohol constituents.

7. Composition according to claims 5, wherein the carboxyl group containing semi-crystalline polyester further contains up to 15 mole % of polyacids relative to the 1,4-cyclohexanedicarboxylic acid and/or terephthalic acid and/or up to 15 mole % of polyols, relative to the 75–100 mole % of aliphatic non-branched and/or cycloaliphatic diols.

8. Composition according to claim 1, wherein the carboxyl group containing semi-crystalline polyester has an acid number (AN) from 10–100 mg KOH/g, a number averaged molecular weight (Mn) from 1100–17000, a fusion zone from 30–150° C., a glass transition temperature (Tg) from −50 to 50° C., a degree of crystallinity of at least 5 J/g and an ICI (cone/plate) viscosity at 175° C. from 5–20000 mPa.s.

9. Composition according to claim 1, wherein the glycidyl group containing acrylic copolymer consists of 10–90 mole % of a glycidyl group containing monomer selected from the group consisting of glycidyl acrylate, glycidyl methacrylate, methyl glycidyl acrylate, methyl glycidyl methacrylate, 3,4-epoxycyclohexylmethyl acrylate, 3,4-epoxycyclohexylmethyl methacrylate, acrylic glycidyl ether and mixtures thereof and 10–90 mole % of monomers copolymerisable with the glycidyl group containing monomers.

10. Composition according to claim 1, wherein the glycidyl group containing acrylic copolymer has an epoxy equivalent weight of 0.3 to 5.0 milliequivalents of epoxy/gram of polymer, a number averaged molecular weight (Mn) from 10000–25000, a glass transition temperature (Tg) from 40–85° C. and an ICI (cone/plate) viscosity at 200° C. from 50–50000 mPa.s.

11. Composition according to claim 1, wherein the curing agent is a polyepoxy compound or a β-hydroxyalkylamide group containing compound.

12. Composition according to claim 1, wherein the binder comprises, based on the total weight of the binder,
(a) 2 to 88.5 parts by weight of the carboxyl group containing amorphous isophthalic acid containing polyester,
(b) 1 to 85 parts by weight of the carboxyl group containing semi-crystalline polyester,
(c) 10 to 60 parts by weight of the glycidyl group containing acrylic copolymer, and
(d) 0.5 to 10.0 parts by weight of the curing agent having functional groups reactive with the polyesters' carboxyl groups.

13. Composition according to claim 1, further comprising one or more additive(s) selected from the group consisting of catalysts, fillers, flow control agents, degassing agents, UV-light absorbers, light stabilizers, antioxidants and other stabilizers.

14. Composition according to claim 1, further comprising one or more dyes and/or pigments.

15. Method of preparing a composition as claimed in claim 1 comprising the steps of blending the components of the composition to prepare a premix, homogenising the premix at an elevated temperature and grounding the homogenised product to obtain the powdered thermosetting composition.

16. Method according to claim 15, wherein in a first step the amorphous polyester and the semi-crystalline polyester are dry blended or melt blended.

17. Powdered varnish or paint consisting of or comprising a composition as claimed in claim 1.

18. Method of preparing a coating on a substrate comprising the steps of applying a powdered varnish or paint as claimed in claim 17 to the substrate and heating the coated substrate to fuse and cure the powdered varnish or paint to obtain the coating.

19. Coating, preparable by the method of claim 18.

20. Substrate entirely or partially coated with the coating of claim 19.

21. The composition according to claim 14 wherein the dyes and/or pigments are metal oxides, metal hydroxides, metal powders, sulphides, sulphates, carbonates, silicates, carbon black, talc, china clay, barytes, iron blue, lead blue, organic reds and organic maroons.

22. The method according to claim 15 wherein the elevated temperature is 70–150° C.

23. Composition according to claim 6, wherein the carboxyl group containing semicrystalline polyester further contains up to 15 mole % of polyacids relative to the linear non-branched aliphatic diacid and/or up to 15 mole % of polyols, relative to the 75–100 mole % of aliphatic non-branched and/or cycloaliphatic diols.

* * * * *